United States Patent [19]

Buckley et al.

[11] Patent Number: 4,878,567

[45] Date of Patent: Nov. 7, 1989

[54] BRAKE/LOCKING DIFFERENTIAL

[75] Inventors: James A. V. Buckley, Whitefish Bay; Donald D. Brown, Thiensville; Glenn S. Metzelfeld, Brookfield, all of Wis.

[73] Assignee: Hayes Industrial Brake, Inc., Mequon, Wis.

[21] Appl. No.: 136,824

[22] Filed: Dec. 22, 1987

[51] Int. Cl.[4] .......................... F16D 67/02; F16D 13/75
[52] U.S. Cl. ............................... 192/18 R; 192/93 A; 192/111 A
[58] Field of Search ............... 192/18 R, 93 A, 111 A

[56] References Cited

U.S. PATENT DOCUMENTS

| | | | |
|---|---|---|---|
| 2,786,560 | 3/1957 | Ishoy | 192/18 R |
| 3,680,669 | 8/1972 | Hansen | 192/18 R |
| 3,820,635 | 6/1974 | Hurt | 192/111 A X |
| 4,352,266 | 10/1982 | Lloyd et al. | 192/18 R X |
| 4,377,224 | 3/1983 | Takata et al. | 192/18 R |
| 4,553,646 | 11/1985 | Carre et al. | 192/111 A X |

FOREIGN PATENT DOCUMENTS

826391  1/1952  Fed. Rep. of Germany .... 192/18 R

Primary Examiner—Rodney H. Bonck
Attorney, Agent, or Firm—Foley & Lardner

[57] ABSTRACT

A brake/locking differential for connecting a first shaft to a second shaft so that the shafts are either braked to a stop or rotated at the same speed, the differential including a clutch plate mounted on one of the shafts and a friction plate mounted on the end of the other shaft for axial motion into engagement with the clutch plate, a frame fixedly mounted with respect to the shafts, a cam plate mounted in the frame in a parallel relation to the friction plate, a sealed thrust bearing mounted on the other of the shafts for axial motion into engagement with the friction plate, an actuator plate positioned between the cam plate and the bearing for moving the bearing and friction plate into engagement with the clutch plate, and a brake ring mounted on the frame for moving the friction plate into engagement with the clutch plate to brake the rotary motion of the shafts and further including a compensating assembly for adjusting the axial position of the actuator plate, thrust bearing, brake plate and friction plate to compensate for wear of the friction pads on the friction plate.

17 Claims, 5 Drawing Sheets

BRAKE/LOCKING DIFFERENTIAL

BACKGROUND OF THE INVENTION

In a hydrostatic transaxle drive, each wheel has a separate hydraulic drive motor which is powered off a single or common pressure source. In the event one of the wheels loses traction, all of the power from the power source will go to the wheel having the least traction. It is desireable, therefore, to provide a connection between the wheels which can be used to equalize the speed of both wheels.

SUMMARY OF THE INVENTION

A principal feature of the present invention is to incorporate a frictionly lockable differential into a hydrostatic transaxle drive which will couple the wheel axles together whenever traction is lost on either wheel. The locking differential is manually actuateable by the operator to interconnect the axles so that they operate at the same speed under conditions where one of the wheels might lose traction while the other wheel is still under traction.

A further feature of this invention is to incorporate into the locking differential a brake for both wheels using the same locking differential. The brake can be manually actuated by the operator whenever the vehicle must be stopped.

A still further feature is the inclusion of a wear compensating mechanism in the differential which compensates for wear of the differential friction material pads each time the differential is actuated to thereby maintain the same stroke each time the differential is activated for maintenance free operation.

Other principal features and advantages of the invention will become apparent to those skilled in the art upon review of the following detailed description, claims and drawings.

Although only one embodiment of the invention is explained in detail, it is to be understood that the invention is not limited in it's application to the details of construction and the arrangement of the components set forth in the following description or illustrated in the drawing. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Figures 1, 2:
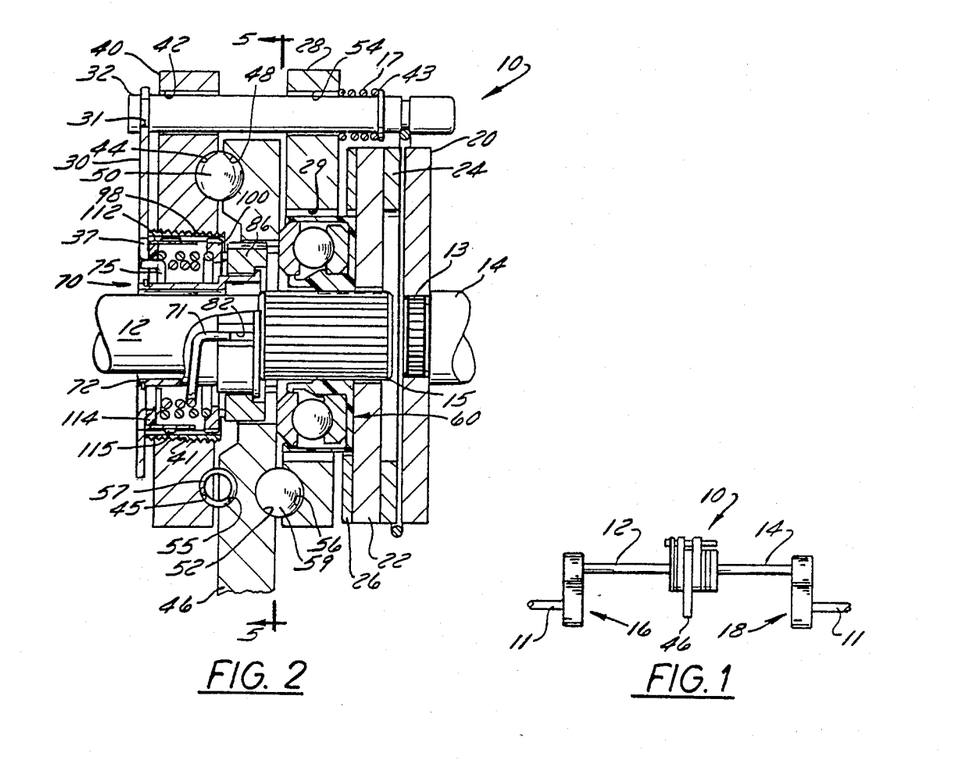
FIG. 1 is a view of the brake/locking differential shown connected to the wheel axles of a vehicle.
FIG. 2 is a side elevation view partly in section of the brake/locking differential shown in the neutral mode.

The brake/locking differential assembly 10 as seen in FIG. 1 of the drawings is used to interconnect the wheel axles 11 for a vehicle through a pair of auxilary shafts 12 and 14. The auxilary shafts 12 and 14 are connected to the wheel axles 11 by means of gear assemblies 16 and 18. In the normal mode of operation the auxilary shafts 12 and 14 are free to rotate with the corresponding wheel axle 11. The locking differential assembly 10 is used in the lock mode to interconnect or lock the shafts 12 and 14 together so that they both rotate at the same speeds thus providing equal speed to both wheel axles. In the brake mode, the auxiliary shafts 12 and 14 are coupled to the differential assembly to prevent rotation of the wheel axles 11.

The assembly 10, as shown in FIG. 2, generally includes a frame formed from a triangular base or plate 30 having a post 32 mounted in a slot 31 on each corner of the triangle. The center of the plate 30 is recessed to form an opening 33 defined by circular flanges 35. Slots 37 are provided on each end of the flanges 35. The frame is shown mounted on the shaft 12 in a fixed position on the vehicle.

A cam plate 40 and a brake ring 28 are mounted on the posts 32 in a parallel relation to the plate 30 and in axial alignment with shaft 12. An actuator plate 46 is positioned between the plates 40 and 28 and is mounted for pivotal and axial motion with respect to shaft 12. A friction plate 22 is mounted on the end of shaft 12 and a clutch plate 20 is secured to the end of the shaft 14. The shafts 12 and 14 are locked together to rotate as a unit by rotating the actuator plate 46 in one direction to move the actuator plate 46 and friction plate 22 axially away from cam plate 40 and into engagement with clutch 20. The shafts 12 and 14 are braked by rotating the actuator plate 46 in the other direction to move the brake plate 28 and friction plate 22 axially into engagement with the clutch plate 20.

Figure 3:
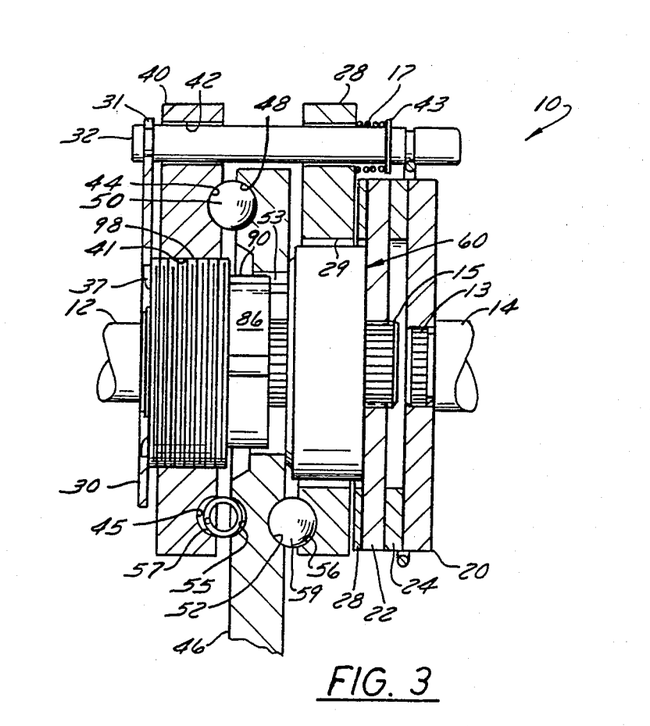
FIG. 3 is a side elevation view similar to FIG. 2 showing the locking differential in the lock mode.
Figures 5, 6, 7:
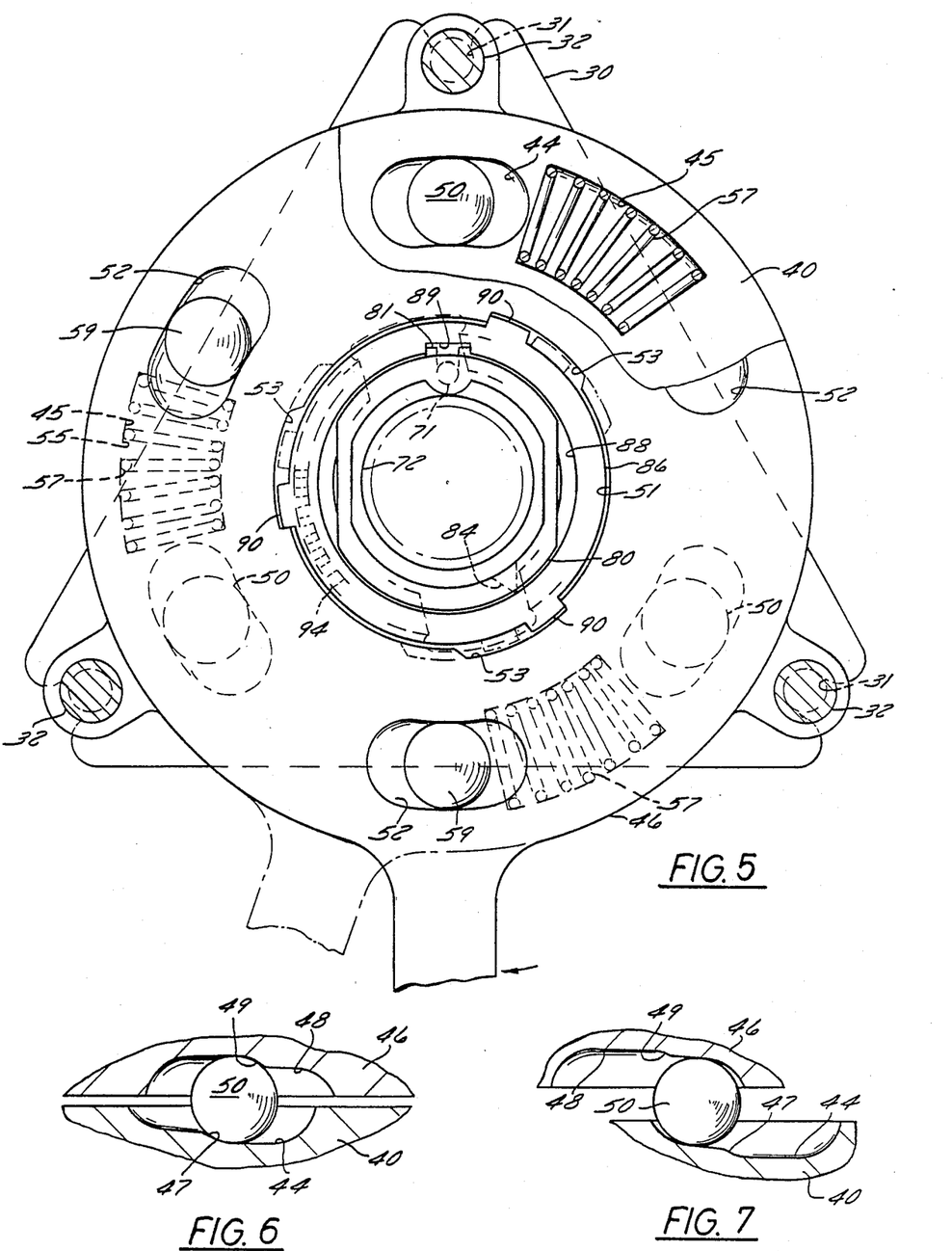
FIG. 5 is an end view taken on line 5—5 of FIG. 2 showing the brake side of the actuator plate and partly broken away to show the cam plate.
FIG. 6 is a cross section view of one of the ball and ramp assemblies for locking the differential with the bore shown in the neutral position.
FIG. 7 is a view similar to FIG. 6 showing the ball and ramp assemblies in the lock position.

Referring to FIGS. 2, 3 and 5, the clutch plate 20 is shown secured to the splined end 13 of shaft 14 and the friction plate 22 is mounted for axially motion on the splined end 15 of shaft 12. The friction plate 22 includes a clutch pad 24 on the side facing the clutch plate 20 and a brake pad 26 on the side facing the brake ring 28. The friction plate 22 is mounted on the splined end 15 of shaft 12 for movement into engagement with the clutch plate 20 to interconnect the shafts 12 and 14 so that they rotate at the same speed.

Means are provided for moving the friction plate 22 into engagement with the clutch plate 20 so that the shafts 12 and 14 rotate as a unit. Such means is in the form of a thrust bearing 60 mounted for axial movement on the splined end 15 of shaft 12, an actuator plate 46 and a cam plate 40 as described hereinafter. The actuator plate 46 is rotated relative to the cam plate 40 so that the actuator plate 46 and thrust bearing 60 move axially with respect to the shaft 12 to move the pad on the friction plate 22 into engagement with the clutch plate 20 on shaft 14.

In this regard, the cam plate 40 includes a center threaded opening 41 and a number of holes 42 corresponding to the number of posts 32. The cam plate 40 is screwed onto a threaded tube 98 which is seated on the plate 30 with the posts 32 passing through holes 42 and the shaft 12 passing through the threaded tube 98. The cam plate 40 includes three ramps 44 and three arcuate slots 45.

The actuator plate 46 includes a center opening 51 and three equally spaced slots 53 around the opening 51. The actuator plate includes three ramps 48 corresponding to ramps 44 in cam plate 40 and three arcuate slots 55 corresponding to the slots 45 in cam pate 40. Three ramps 52 are also provided on the opposite side of the actuator plate 46. The actuator plate 46 is positioned next to the cam plate 40 with the ramps 48 located opposite the ramps 44 and the slots 55 opposite slots 45 in the cam plate 40.

The actuator plate 46 is moved away from the cam plate 40 by means of ball bearings 50 which are placed between each set of opposing ramps 44 and 48. The ramps are arranged so that the actuator plate 46 when moved clockwise in FIG. 5, will be moved away from the cam plate 40 by the ball bearings 50 rolling up the ramps 44 and 48. The actuator plate 46 will move axially to the right as seen in FIG. 3. The actuator plate 46 is returned to the neutral position by means of compression springs 57 positioned in slots 45 in cam plate 40 and slots 55 in actuator plate 46.

Referring to FIG. 6, one of the balls 50 is shown in the neutral position between the ramps 44 and 48. A fast rise cam 47, 49 is provided in each of the ramps 44, 48, respectively. On rotation of the plate 46 as seen in FIG. 7, the ball 50 rolls up the cam 47 and 49 forcing the plate 46 away from plate 40. The actuator plate 46 is biased to the neutral position by means of the compression spring 57 positioned in the slots 45 and 55.

Figure 8:
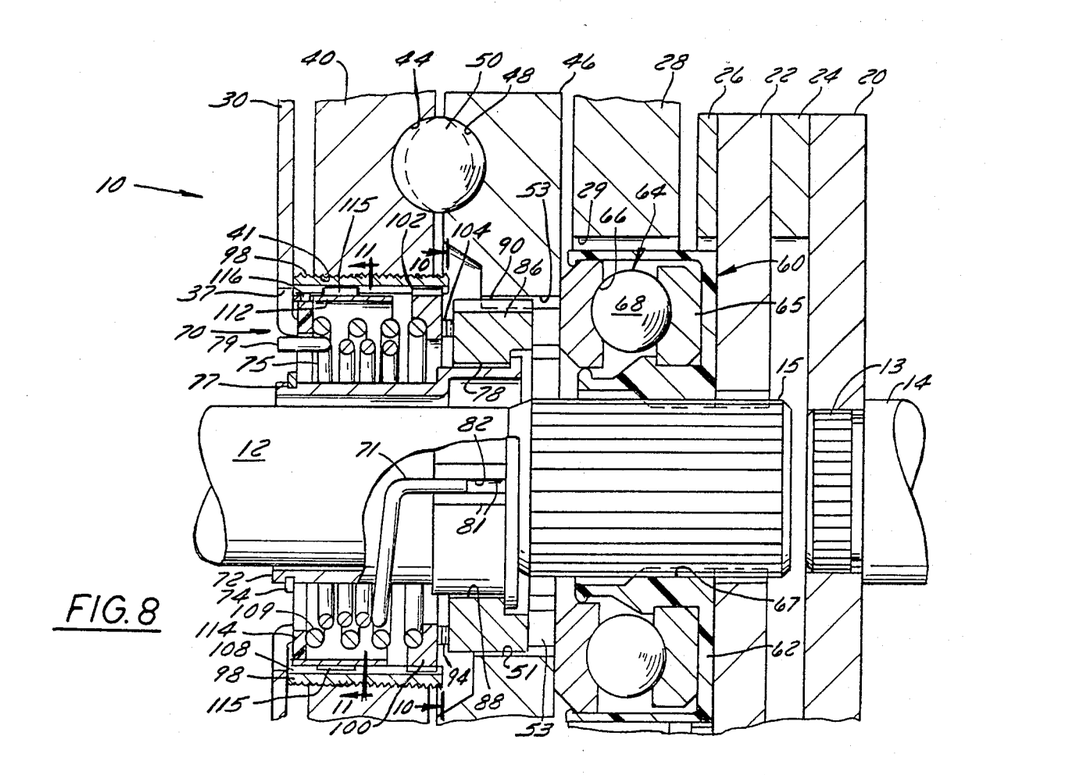
FIG. 8 is an enlarged cross sectional view of the compensating mechanism.

The thrust bearing 60 is also mounted on the splined end 15 of shaft 12 between the actuator plate 46 and the friction plate 22. The thrust bearing 60, as shown in FIGS. 2 and 8, includes a housing 62 having a splined opening 67 corresponding to the splined shaft 15. The housing 62 is mounted on splined shaft 15 in a position to move into engagement with friction plate 22. A ball bearing assembly 64 is provided in the housing 62 which includes an inner bearing race 65, an outer bearing race 66 and a number of ball bearings 68 positioned in the bearing races 65 and 67, respectively. The outer race 66 is engaged by the axial motion of the actuator plate 46 forcing the housing 62 into engagement with the friction plate 22. When the actuator plate 46 is moved clockwise in FIG. 5, the thrust bearing 60 will be pushed against the friction plate 22 forcing the friction pad 24 on the friction plate 22 into engagement with the clutch plate 20. The housing 62 of the bearing assembly 64 will rotate with the friction plate 22 while the outer race 66 will remain fixed with respect to the actuator plate 46. On engagement of the friction plate 22 with the clutch plate 20, the two plates 22, 20 will be locked together so that the axles 12, 14 rotate at the same speed.

Brake Mechanism

Brake means are also provided for preventing the rotation of the shafts 12 and 14. Such means is in the form of a brake ring 28 positioned between the actuator plate 46 and the friction plate 22. The brake ring 28 is provided with three ramps 56, a center opening 29 and three openings 54 in the outer periphery of the brake ring 28. The brake ring 28 is mounted on the posts in a parallel relation to the actuator plate 46 with the posts 32 extending through the openings 54 and the bearing 60 centered in opening 29. The brake ring 28 is biased by means of a spring 17 on each post 32 toward the actuator plate 46. The springs 17 being retained on the posts 32 by retainer rings 43.

Figure 4:
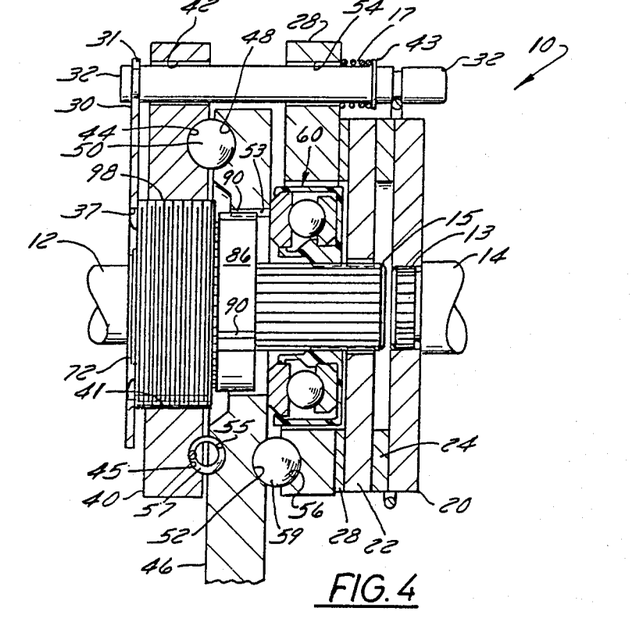
FIG. 4 is a side elevation view similar to FIG. 2 showing the locking differential in the brake mode.

The actuator plate 46 and brake ring 28 are separated by means of ball bearings 59 placed in each of the opposite sets of ramps 52 and 56. On rotation of the actuator plate 46 counterclockwise, the balls 59 will roll up ramps 52 and 56 moving the brake ring 28 away from the actuator plate 46 into engagement with the brake pads 26 on the friction plate 22. The friction plate 22 will move toward the clutch plate 20 on the shaft 14 as seen in FIG. 4 until the pads 24 engage clutch plate 20. The brake ring 28 will stop the rotation of the friction plate 22 and the clutch plate 20. The shafts 12 and 14 will be then stopped in a braking mode.

Compensating Mechanism

Means are provided for compensating for wear of the clutch pad 24. Such means is in the form of a compensating mechanism 70 mounted on the shaft 12 and operatively connected to the cam plate 40.

Figure 9:
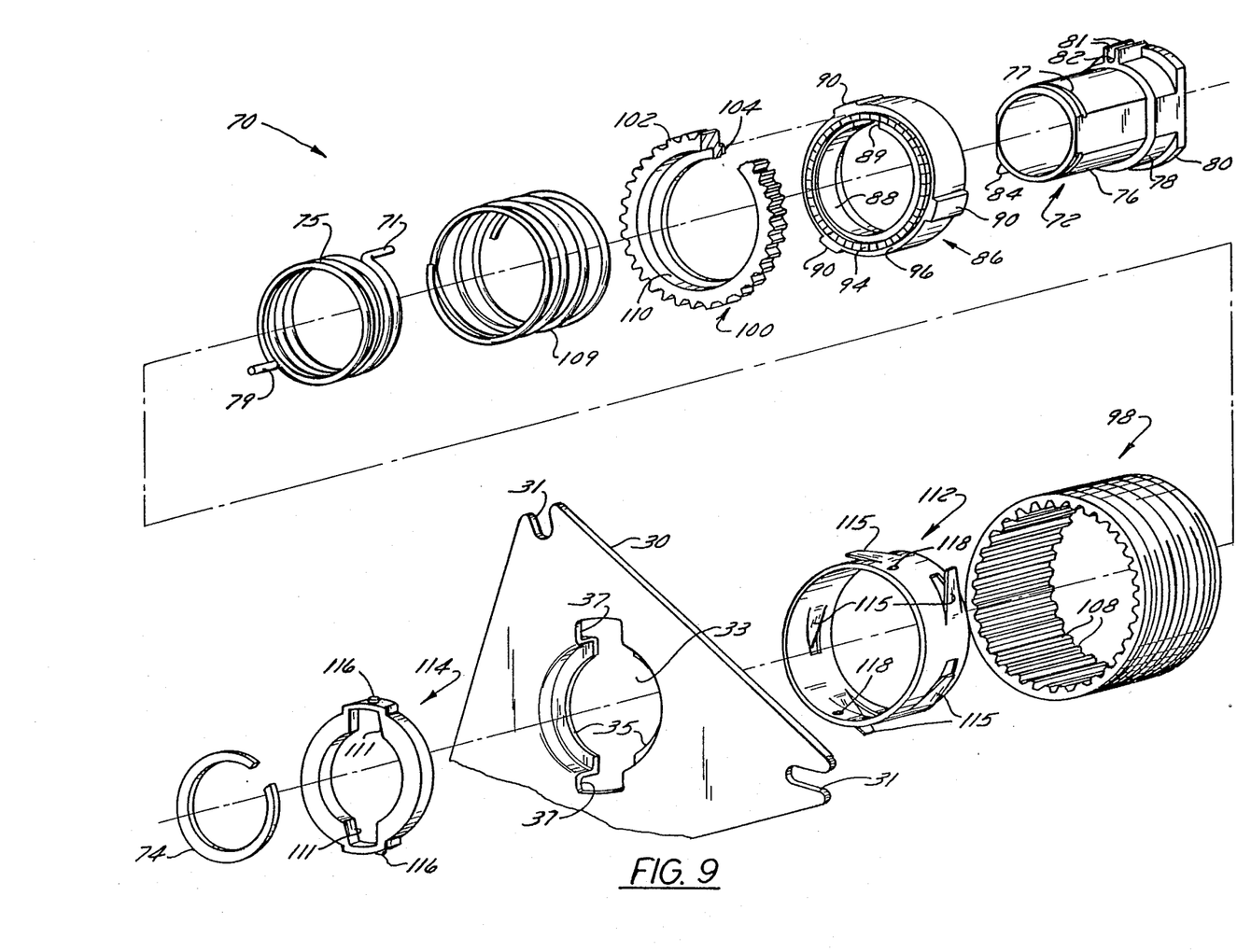
FIG. 9 is an exploded perspective view of the compensating mechanism.
Figure 10:
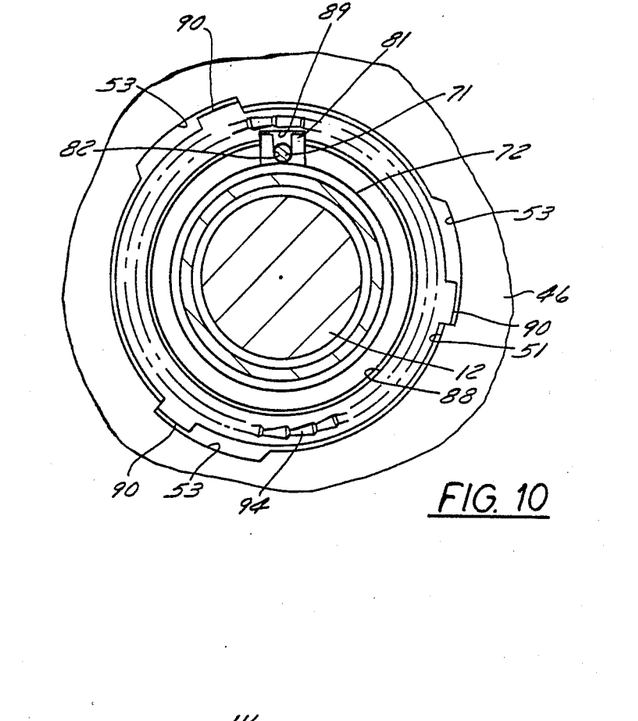
FIG. 10 is a view taken on line 10—10 of FIG. 8 showing the bottom of the drive clutch.
Figure 11:
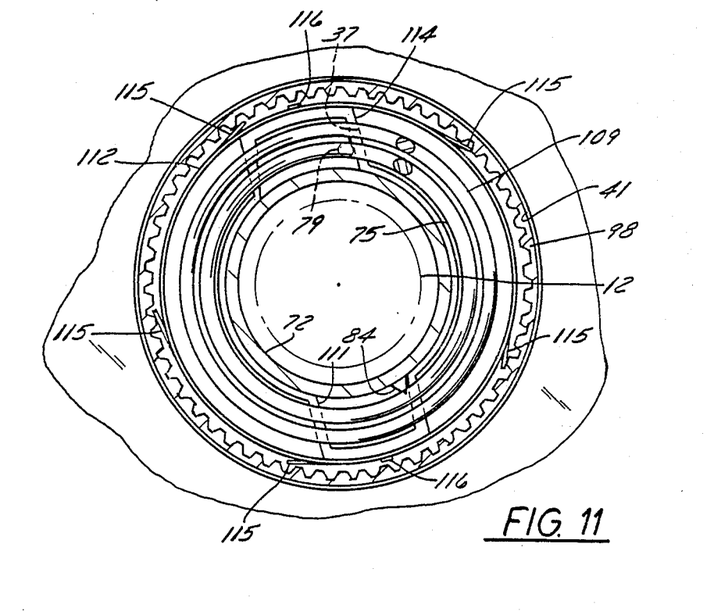
FIG. 11 is a view taken on line 11—11 of FIG. 8 showing the back stop ring mounted in the threaded tube.

The cam plate 40 is moved away from plate 30 in incremental steps in accordance with the amount of wear of the pad 24 sensed by the mechanism 70. Referring to FIGS. 9, 10 and 11 the compensating mechanism 70 includes a tubular member 72 mounted for pivotal motion within the flange 35 in the triangular plate 30 and clamped therein by means of a snap ring 74. The member 72 includes a first or main portion 76 having a diameter corresponding to the diameter of the opening between flanges 35 and a second or head portion 78 terminating at a flange 80. A groove 77 is provided around the end of the main portion 76. A pair of ribs 81 are provided on the outside of the head portion 78 to form a slot 82 and a stop tab 84 is provided at the end of the first portion 76. The tubular member 72 extends through a drive clutch 86 and a threaded tube 98 with the end extending through flanges 35 and washer 114. The snap ring 74 is positioned in annular groove 77 to lock the member 72 in position. The tab 84 should be positioned in the slotted portion 111 of washer 114 that extends into one of the slots 37 as shown in FIG. 11. The tubular member 72 is biased by means of a torsion spring 75 to an initial or starting position with respect to the plate 30.

In this regard and referring to FIG. 11, the tab 84 on the member 72 is shown seated against one edge of the slotted portion 111 in the washer 114. The bottom end 79 of the spring 75 is also seated against the edge of slots 111 in washer 114 located on the opposite side of plate 30. The upper end 71 of the spring 75 is aligned in the slot 82 between ribs 81 at the upper end of tubular member 75. Clockwise movement shown in FIGS. 5 and 11, of the tubular member 72 will move tab 84 off of washer 114 and will wind up the spring 75 so that the tubular member 72 returns to the initial position when the actuator 46 is released.

Means are provided for operatively connecting the tubular member 72 to the actuator plate 46. Such means is in the form of a drive clutch 86 having a central opening 88, a slot 89 in the opening 88 and a number of ribs 90 on the outer surface corresponding to the number of slots 53 in the opening 51 of the actuator plate 46. The tubular member 72 is connected to the drive clutch 86 by means of the ribs 81 which are aligned with slot 89 on the inside diameter of the drive clutch 86. An annular set of ratchet teeth 94 is provided on the bottom face 96 of the drive clutch 86. With this arrangement the drive clutch 86 and tubular member 72 will rotate with the actuator plate 46 whenever the end of the slots 53 engage the ribs 90 on the drive clutch.

The rotary motion of the actuator plate 46 is transferred to the threaded tube 98 by means of a clutch 100. In this regard, the threaded tube 98 is screwed into the threaded opening 41 in the cam plate 40 and is seated on the triangular plate 30. Rotary motion of the threaded tube 98 will move the cam plate 40, actuator plate 46, bearing 60, brake plate 28 and friction plate 22 toward the clutch plate 20. As described hereinafter, small incremental rotary movements are imparted to the threaded tube 98 in direct relation to the amount of rotary motion of the actuator plate 46 required to lock the friction plate 72 to the clutch plate 20.

The clutch 100 is in the form of a ring having gear teeth 102 on the outer surface and an annular set of ratchet teeth 104 on the upper face 106. The gear teeth 102 mate with an internal set of gear teeth 108 provided on the inside of the threaded tube 98. The annular set of ratchet teeth 104 on the clutch 100 are aligned with the ratchet teeth 94 provided on the bottom face 96 of drive clutch 86. The clutch 100 is biased into engagement with the drive clutch 86 by means of a compression spring 109 positioned between the plate 30 and a spring seat 110 provided in clutch 100.

Means are provided for preventing return motion of the threaded tube 98 when advanced by the actuating plate 46 to lock the shafts 12 and 14 together. Such means is in the form of a back stop ring 112 positioned inside of the tube 98. The back stop ring 112 is formed from a strip of a stainless steel having five tabs 115 punched at spaced intervals. The tabs 115 are located at 71.8 degree intervals. The ring 112 is seated on the plate 30 around the outside of flanges 35 is secured to the plate 30 by means of washer 114 positioned in the recess formed by flanges 35. Knobs 116 are provided on each end of washer 114 and are positioned in slots 37 to engage holes 118 provided in ring 112. The threaded tube 98 is positioned on the ring 112 with the tabs 115 biased into engagement with the gear teeth 108. The tabs 115 are arranged to sequentially engage the teeth 108. There are 36 gear teeth 108 and five tabs 115 providing 180 incremental stops. After each 2 degrees of rotary motion of the tube 98 a different tab 115 will move to a blocking position with respect to the teeth 108 preventing return motion of the threaded tube 98. As the threaded tube 98 rotates, the cam plate 40 is moved axially away from plate 30 an incremental distance.

The embodiment of the invention in which an exclusive property or privilege is claimed, are defined as follows:

1. A brake/locking differential assembly for locking a first shaft to a second shaft so that the shafts either rotate as a unit or brake as a unit,
said assembly comprising,
a clutch plate secured to the end of one of said shafts,
a friction plate mounted for axial movement on the end of the other of said shafts and being axially aligned with said clutch plate,
a frame mounted in a fixed relation to said shafts,
a cam plate mounted on said frame in axial alignment with the other of said shafts,
an actuator plate mounted in a parallel relation to said cam plate for pivotal and axial motion on the other of said shafts,
first means located between said cam plate and said actuator plate for moving said actuator plate away from said cam plate when said actuator plate is pivoted in one direction on said shaft,
a thrust bearing mounted on the other of said shafts between said actuator plate and said friction plate,
whereby said actuator plate will move said thrust bearing and said friction plate axially into engagement with said clutch plate when said actuator plate is pivoted in one direction so that said shafts rotate at the same speeds,
a brake ring mounted on said frame between said actuator plate and said friction plate for axial motion with respect to the other of said shafts, and
second means located between said actuator plate and
said brake ring for moving said brake ring axially into engagement with said friction plate and said friction plate axially into engagement with said clutch plate on pivotal motion of said actuator plate in the opposite direction whereby said first and second shafts will be locked in a braking mode.

2. The assembly according to claim 1 including wear compensating means mounted on said frame and operatively connected to said actuator plate for moving said cam plate toward said clutch plate an incremental distance when said actuator plate is rotated in said one direction to compensate for any wear between said friction plate and said clutch plate.

3. The assembly according to claim 2 wherein said wear compensating means includes means for preventing return motion of said cam plate when said actuator plate is rotated a distance greater than the distance normally required to lock the friction plate to the clutch plate.

4. The assembly according to claim 1 wherein said first moving means comprises a number of ramps in said cam plate and a number of ramps in said actuator plate corresponding to said ramps in said cam plate and a ball bearing positioned in each corresponding set of ramps.

5. The assembly according the claim 1 wherein said second moving means comprises a number of ramps in said brake ring and a number of ramps in said actuator plate corresponding to the ramps in said brake ring, and a ball bearing positioned between each set of ramps.

6. A locking differential assembly for connecting a first shaft to a second shaft,
said assembly comprising a clutch plate secured to the end of the first shaft,
a friction plate mounted for axial motion on the end of the second shaft,
and means for selectively moving said friction plate from a neutral position into locking engagement with said clutch plate whereby the first and second rotating shafts will rotate at the same speed,
said moving means including a thrust bearing assembly mounted on the second shaft for axial movement into engagement with said friction plate, an actuator plate mounted for axial movement into engagement with said thrust bearing and cam means for moving said actuator plate axially into engagement with said thrust bearing on rotary motion of said actuator plate in one direction with respect to the second shaft whereby said friction plate will be moved into engagement with said clutch plate to interlock the rotating shafts, and means for braking rotary motion of the shafts, said braking means including a brake plate positioned between said actuator plate and said friction plate and cam means located between said actuator plate and said brake plate whereby on rotary motion of said actuator plate in the opposite direction said brake plate will move said friction plate from a neutral position into engagement with said clutch plate whereby said shafts will be prevented from rotary motion.

7. The assembly according to claim 6 including wear compensating means mounted on said cam means and operatively connected to said actuator plate for moving said cam plate toward said clutch plate an incremental distance when said actuator plate is rotated in said one direction to compensate for any wear between said friction plate and said clutch plate.

8. The differential according to claim 7 including means for braking rotary motion of the shafts, said braking means including a brake plate positioned between said actuator plate and said friction plate and cam means located between said actuator plate and said brake plate whereby on rotary motion of said actuator plate in the opposite direction said brake plate will move said friction plate from a neutral position into engagement with said clutch plate whereby said shafts will be prevented from rotary motion.

9. A brake/locking differential assembly for braking the rotary motion of a pair of axially aligned rotating shafts or for connecting the axially aligned rotating shafts to rotate at the same speed, said assembly comprising a clutch plate secured to the end of one of the shafts, a friction plate mounted on the end of the other shaft for movement into engagement with said clutch plate, a frame mounted in a fixed position relative to said shafts and including a number of posts mounted in a parallel relation to said other of the shafts, an actuator plate mounted between said friction plate and said cam plate for axial movement with respect to the other of said shafts, a bearing assembly mounted for axial motion on said other of said shafts between said actuator plate and said friction plate, and first cam means between said cam plate and said actuator plate, whereby on rotary motion of said actuator plate in one direction said bearing assembly and friction plate will move axially into engagement with said clutch plate so that the shafts rotate at the same speed, a brake ring mounted on said posts between said actuator plate and said friction plate, and second cam means between said actuator plate and said brake ring whereby on rotation of said actuator plate in the opposite direction said brake ring will move said friction plate into engagement with said clutch plate to stop the rotation of said shafts.

10. The assembly according to claim 9 wherein said first cam means comprises a number of ramps in said cam plate and a number of ramps in said actuator plate corresponding to said ramps in said cam plate and a ball bearing positioned in each corresponding set of ramps.

11. The assembly according to claim 10 wherein said second cam means comprises a number of ramps in said brake ring and a number of ramps in said actuator plate corresponding to the ramps in said brake ring, and a ball bearing positioned between each set of ramps.

12. The assembly according to claim 9, 10 or 11 including wear compensating means mounted on said frame and operatively connected to said actuator plate for moving said cam plate toward said clutch plate an incremental distance when said actuator plate is rotated in said one direction to compensate for any wear between said friction plate and said clutch plate.

13. The assembly according to claim 12 wherein said wear compensating means includes means for preventing return motion of said cam plate when said actuator plate is rotated a distance greater than the distance normally required to lock the friction plate to the clutch plate.

14. A locking differential assembly for locking a first shaft to a second shaft so that the shafts rotate as a unit, said assembly comprising:

a clutch plate secured to the end of one of said shafts, a friction plate mounted for axial movement on the end of the other of said shafts and being axially aligned with said clutch plate, a frame mounted in a fixed relation to said shafts, a cam plate mounted on said frame in axial alignment with said other of said shafts, an actuator plate mounted in a parallel relation to said cam plate for pivotal and axial motion on the other of said shafts, and first means located between said cam plate and said actuator plate for moving said actuator plate away from said cam plate when said actuator plate is pivoted in one direction on said shaft, a thrust bearing mounted on the other of said shafts between said actuator plate and said friction plate whereby said actuator plate will move said thrust bearing and said friction plate axially into engagement with said clutch plate so that said shafts rotate at the same speed, and wear compensating means mounted on said frame and being operatively connected to said actuator plate for moving said cam plate toward said clutch plate an incremental distance once said actuator plate is rotated in said one direction to compensate for any wear between said friction plate and said clutch plate.

15. The assembly according to claim 14 wherein said wear compensating means includes means for preventing return motion of said cam plate when said actuator plate is rotated a distance greater than the distance normally required to lock the friction plate to the clutch plate.

16. A locking differential assembly for connecting a first shaft to a second shaft, said assembly comprising:

a clutch plate secured to the end of the first shaft, a friction plate mounted for axial motion on the end of the second shaft, means for selectively moving said friction plate from a neutral position into locking engagement with said clutch plate whereby the first and second shafts will rotate at the same speed, said moving means including a thrust bearing assembly mounted on the second shaft for axial movement into engagement with said friction plate, an actuator plate mounted for axial movement into engagement with said thrust bearing, cam means for moving said actuator plate axially into engagement with said thrust bearing on rotary motion of said actuator plate in one direction with respect to the second shaft whereby said friction plate will be moved into engagement with said clutch plate to interlock the rotating shafts, wear compensating means mounted on said cam means and being operatively connected to said actuator plate for moving said cam plate toward said clutch plate an incremental distance when said actuator plate is rotated in said one direction to compensate for any wear between said friction plate and said clutch plate.

17. The assembly according to claim 16 wherein said wear compensating means includes means for preventing return motion of said cam plate when said actuator plate is rotated a distance greater than the distance normally required to lock the friction plate to the clutch plate.

* * * * *